United States Patent
Fuetsch et al.

(10) Patent No.: US 7,346,756 B2
(45) Date of Patent: Mar. 18, 2008

(54) SYSTEM, COMPUTER READABLE MEDIUM AND METHOD FOR MULTI-TIERED DATA ACCESS

(75) Inventors: Andre Fuetsch, San Antonio, TX (US);
Baofeng Jiang, Pleasanton, CA (US);
Jerold Osato, Pinole, CA (US);
Mengfeng Tsai, Fremont, CA (US);
Xidong Wu, Livermore, CA (US)

(73) Assignee: SBC Knowledge Ventures, L.P., Reno, NV (US)

( * ) Notice: Subject to any disclaimer, the term of this patent is extended or adjusted under 35 U.S.C. 154(b) by 267 days.

(21) Appl. No.: 11/227,053

(22) Filed: Sep. 15, 2005

(65) Prior Publication Data

US 2007/0061523 A1   Mar. 15, 2007

(51) Int. Cl.
*G06F 9/26* (2006.01)
*G06F 9/34* (2006.01)
(52) U.S. Cl. ..................................................... 711/202
(58) Field of Classification Search ................. 711/203
See application file for complete search history.

(56) References Cited

U.S. PATENT DOCUMENTS

| | | | |
|---|---|---|---|
| 6,363,388 B1 | 3/2002 | Sprenger et al. | |
| 6,516,320 B1 | 2/2003 | Odom et al. | |
| 2005/0033717 A1 | 2/2005 | Ellis et al. | |
| 2005/0060178 A1 | 3/2005 | Kirkland et al. | |
| 2005/0080791 A1 | 4/2005 | Ghatare | |
| 2005/0177587 A1 | 8/2005 | Mukundan et al. | |
| 2005/0182890 A1* | 8/2005 | Yamagami | 711/4 |
| 2006/0149765 A1* | 7/2006 | Knoerle et al. | 707/101 |

* cited by examiner

*Primary Examiner*—Hyung S. Sough
*Assistant Examiner*—Hamdy S Ahmed
(74) *Attorney, Agent, or Firm*—Brooks Kushman P.C.

(57) ABSTRACT

A system, computer readable medium, and method for multi-tiered data access. The method includes the steps of determining a first search parameter and a second search parameter in response to an operator initiated command, determining a physical location of a data unit corresponding to the first search parameter, identifying a data member corresponding to the second search parameter, and outputting the data member to an operator interface device.

20 Claims, 4 Drawing Sheets

SYSTEM, COMPUTER READABLE MEDIUM AND METHOD FOR MULTI-TIERED DATA ACCESS

BACKGROUND OF THE DISCLOSURE

1. Field of the Disclosure

This disclosure relates generally to a system, computer readable medium, and method for multi-tiered data access.

2. Background Art

As the volume of stored data increases, conventional (i.e., single tiered) data systems become increasingly inefficient. Some conventional data systems attempt to address the inefficiencies by optimizing the system for either data storage or data retrieval. For example, conventional data systems may maintain a large index corresponding to the stored data. Such indexing may provide improved data retrieval speeds but generally decreases the speed of data loading (i.e., the addition of new data, data storage) and consumes system resources. Conversely, conventional data systems using minimal data indexing generally provide improved data loading speeds but decreased data retrieval speeds. Such data retrieval/data loading tradeoffs may be problematic in systems where real time applications, such as Internet WEB applications, require the ability to rapidly retrieve data while system data is being updated and/or loaded.

In addition, data corruption in conventional data systems may propagate rapidly, causing data loss and requiring reinstallation of a large quantity of data from a backup. The reinstallation process may further subject the system to an additional risk of data loss.

Conventional data systems may also require extensive modification to add additional forms of data, especially forms of data having a format that differs from the data formats previously stored by the data system.

BRIEF DESCRIPTION OF THE DRAWINGS

The present disclosure, both as to its organization and manner of operation, together with further objects and advantages thereof, may be best understood with reference to the following description, taken in connection with the accompanied drawings in which.

DETAILED DESCRIPTION

The present disclosure generally provides a system, method and computer readable medium for multi-tiered data access. One embodiment of the present disclosure may provide increased data storage and/or data retrieval rates. Another embodiment may impede data corruption propagation such that data loss and/or reinstallation of data from a backup may be reduced. Another embodiment may provide increased data retrieval rates while reducing the data storage requirement of a system. Yet another embodiment may provide increased data storage and/or retrieval efficiency in multi-processor machines. Still yet another embodiment may reduce the amount of modification required to add additional forms of data to the system. It should be understood that other embodiments of the disclosure may provide yet additional and/or alternative benefits.

According to an embodiment of the present disclosure, then, a computer-readable medium storing a program executable by a processor for multi-tiered data access is provided. The medium comprises a logical mapping code segment and a physical mapping code segment. The logical mapping code segment determines a first search parameter and a second search parameter corresponding to an operator initiated command. The physical mapping code segment receives the first and second search parameters, determines a physical location of a data unit corresponding to the first search parameter, identifies a data member corresponding to the second search parameter, and outputs the data member to an operator.

According to another embodiment, a system is provided for multi-tiered data access. The system comprises a logical mapping apparatus and a physical mapping apparatus. The logical mapping apparatus determines a first search parameter and a second search parameter corresponding to an operator initiated command. The physical mapping apparatus receives the first and second search parameters, determines a physical location of a data unit corresponding to the first search parameter, identifies a data member corresponding to the second search parameter, and outputs the data member to an operator.

According to yet another embodiment, a method is provided for multi-tiered data access. The method comprises the steps of determining a first search parameter and a second search parameter in response to an operator initiated command, determining a physical location of a data unit corresponding to the first search parameter, identifying a data member corresponding to the second search parameter, and outputting the data member to an operator interface device.

It is to be understood that the previous and subsequently disclosed embodiments are merely exemplary. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ the present disclosure. In the figures and in the discussion that follows, like reference numbers indicate like elements.

Figure 1:
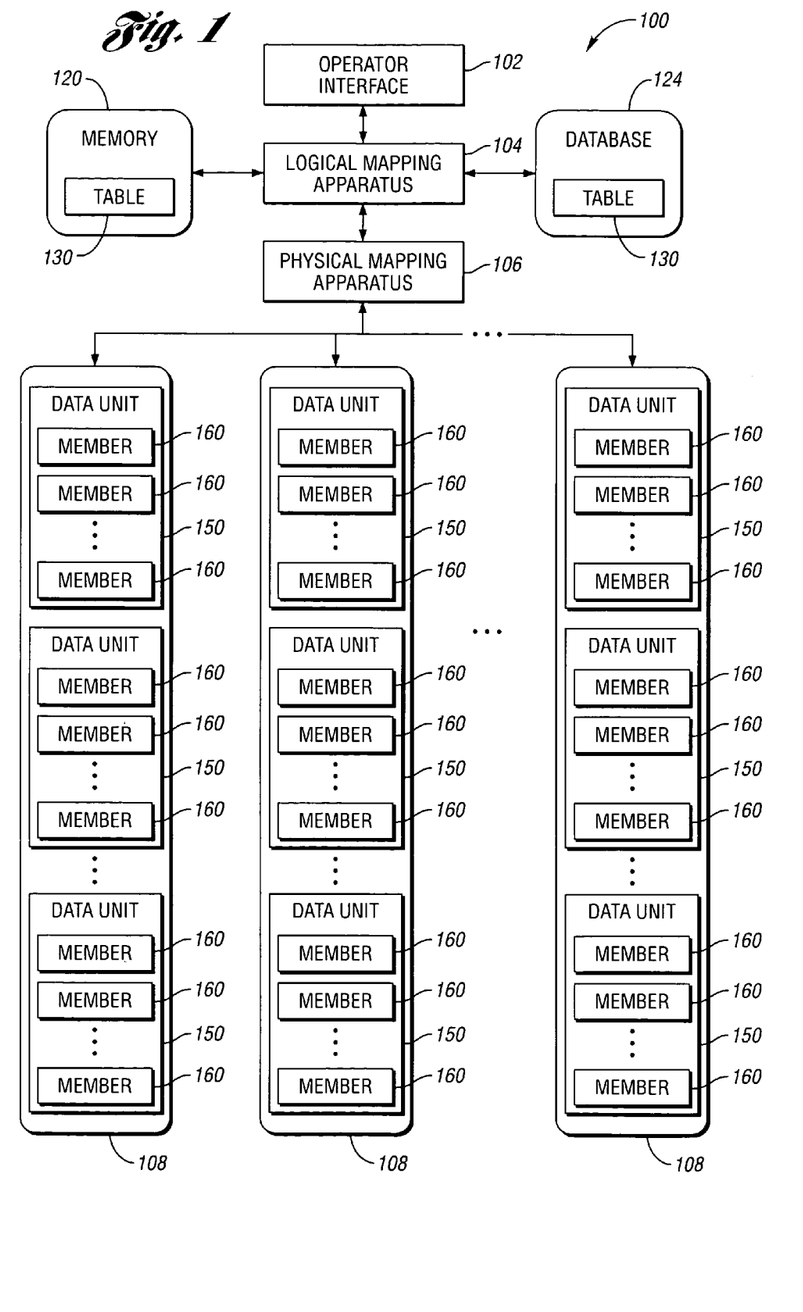
FIG. 1 is a block diagram of a system for multi-tiered data access according to an embodiment of the present disclosure.

Referring to FIG. 1, a system 100 for multi-tiered data access according to an embodiment of the present disclosure is shown. The system 100 may comprise an operator interface (i.e., operator interface device) 102, a logical mapping apparatus 104, a physical mapping apparatus 106 and a physical data storage device 108.

The operator interface 102 may be any appropriate interface device, such as a keyboard, a touchscreen, a mouse, a display, a voice recognition device, a light pen, a speaker and the like, for electronically coupling to the logical mapping apparatus 104, transmitting an operator initiated command (i.e., operator command) (e.g., a data request) to the logical mapping apparatus 104 and/or conveying information (e.g., data) to an operator.

The logical mapping apparatus 104 may be electronically coupled to the operator interface 102 for receiving the operator command. In at least one embodiment, the logical mapping apparatus 104 may be a computer or other logical device, such as an Application Specific Integrated Circuit, which executes software application programs and/or which performs other logical exercises. However, the logical mapping apparatus 104 may include any type of unit or entity which can determine one or more search parameters (e.g., first search parameter, second search parameter, etc.) corresponding to the operator command.

In one embodiment, the logical mapping apparatus 104 may use a table 130 for determining a search parameter corresponding to the operator command. Furthermore, in at least one embodiment, the table 130 may reside in a memory 120, such as a solid state memory, a read-only memory, a random access memory, an EPROM, an EEPROM and the like, and/or a database 124 electronically coupled to the logical mapping apparatus 104. Optionally, the logical mapping apparatus 104 may use a hash function (not shown) for determining a search parameter. However, the logical mapping apparatus 104 may use any appropriate algorithm and/or look-up device to determine the one or more search parameters corresponding to the operator command.

The logical mapping apparatus 104 is generally electronically coupled to the physical mapping apparatus 106 and presents the one or more search parameters to the physical mapping apparatus 106.

The physical mapping apparatus 106 may be electronically coupled to one or more physical data storage devices 108, such as a magnetic media, an optical media, a hard drive, a memory device, and/or the like. Each of the data storage devices 108 may comprise one or more physical and/or logical data units 150, such as a file, a table, and the like. Each data unit 150 generally corresponds to a set of related data (i.e., a data set), such as data corresponding to a business group, a network, a device, and the like.

Similarly, each data unit 150 may comprise one or more data members 160. Each data member 160 generally corresponds to a related sub-set of the data unit 150, such as data corresponding to an individual department within a business group, an individual network device, an individual device user, and the like. In at least one embodiment, a data member 160 may represent the smallest sub-set of data that may be retrieved in response to the operator command. However, implementation having additional levels (i.e., tiers) is contemplated within the spirit and scope of the present invention. Accordingly, additional sub-groupings (not shown) of data within a data member 160 are contemplated by the present disclosure.

The physical mapping apparatus 106 is generally a computer or other logical device, such as an Application Specific Integrated Circuit, which executes software application programs and/or which performs other logical exercises. In at least one embodiment, the functionality of the physical mapping apparatus 106 may be implemented in the same device as the logical mapping apparatus 104.

In particular, the physical mapping apparatus 106 generally receives the one or more search parameters from the logical mapping apparatus 104 and determines a physical location of a data unit 150 corresponding to a first search parameter. In at least one embodiment, the first search parameter may represent (i.e., correspond to) a device such as an Asymmetric Digital Subscriber Line, an Asynchronous Transfer Mode Switch, a Digital Subscriber Line Access Multiplexer, etc. and the corresponding data unit 150 may include data relating to the physical device.

In general, the physical location may be any appropriate address (i.e., location) on any appropriate storage device 108, such as a location on a magnetic media, a location on an optical media, a location on a hard drive, a memory address, and the like. In at least one embodiment, the first search parameter may resolve (i.e., map) directly into the address of the data unit 150. For example, the first parameter may form all or part of a file name that resolves into the address of a data unit 150 stored on a storage device 108 via a file directory. Similarly, in another embodiment, the first parameter may form all or part of the name of a table stored in memory.

The physical mapping apparatus may also identify a data member 160 (i.e., a data member 160 of the data unit 150 corresponding to the first search parameter) corresponding to the second search parameter. In one embodiment, the second search parameter may represent (i.e., correspond to) a port on a device such as an Asymmetric Digital Subscriber Line, an Asynchronous Transfer Mode Switch, a Digital Subscriber Line Access Multiplexer, etc. and the corresponding data member 160 may include data relating to an object coupled to the port. In addition, at least one embodiment may include one or more data member 160 stored in a compressed state (i.e., compressed data object) and/or as a Binary Large Object (i.e., BLOG).

The physical mapping apparatus 106 may output the data member 160 to the operator. In at least one embodiment, the physical mapping apparatus 106 may output the data member 160 to the operator using the operator interface 102.

Figure 2:
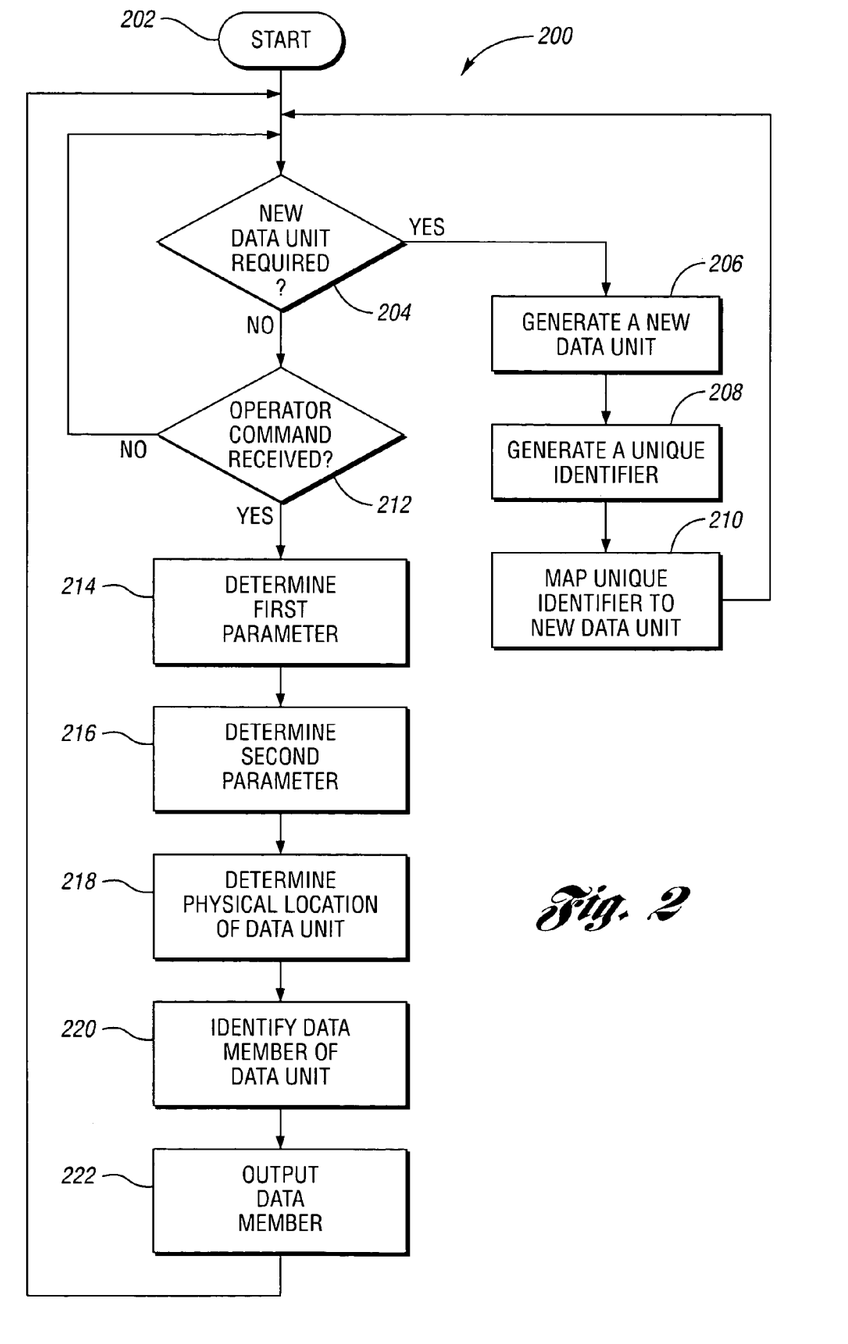
FIG. 2 is a flow diagram of a method for multi-tiered data access according to an embodiment of the present disclosure.

Referring to FIG. 2, a flow diagram of a method 200 for multi-tiered data access according to an embodiment of the present disclosure is shown. The method 200 may be advantageously implemented in connection with any appropriate system to meet the design criteria of a particular application, such as the system 100 described previously in connection with FIG. 1. In particular all or parts of the method 200 may be performed by one or more logical devices, such as the logical mapping apparatus 104 and/or the physical mapping apparatus 106. The method 200 generally includes a plurality of blocks or steps that may be performed serially. As will be appreciated by one of ordinary skill in the art, the order of the block/steps shown in FIG. 2 is exemplary and the order of one or more block/steps may be modified within the spirit and scope of the present disclosure. In addition, the blocks/steps of the method 200 may be performed in at least one non-serial (or non-sequential) order, and one or more blocks/steps may be omitted to meet the design criteria of a particular application. Similarly, two or more of the blocks/steps of the method 200 may be performed in parallel. Block 202 represents an entry point into the method 200.

Decision block 204 generally determines when a new data unit (e.g., data unit 150) is required. In general, the addition of a new data unit is required to expand the system (e.g., the system 100) to include data not represented by an existing data unit. For example, in one embodiment, each data unit may correspond to an element of a network (not shown). When a new device (i.e., element) is added to the network, a new data unit is generally required to represent data associated with the new device. The method 200 generally proceeds to step 206 when a new data unit is required (i.e., the YES leg of decision block 204). Otherwise, the method 200 may fall through to step 212 (i.e. the NO leg of decision block 204).

At step 206, a new data unit may be generated.

At step 208, a unique identifier may be generated. In at least one embodiment, such as the exemplary embodiment described in connection with decision block 204, the unique identifier may correspond to the name of a new device.

At step 210, the unique identifier may be mapped to the new data unit. From step 210, the method 200 may return to decision block 204.

Decision block 212 generally determines when an operator initiated command (i.e., operator command) has been received. The method 200 may proceed to step 214 when an operator command is received (i.e., the YES leg of decision block 212). Otherwise, the method 200 generally return to decision block 204 (i.e. the NO leg of decision block 212).

At step 214, a first search parameter may be determined based at least in part on the operator initiated command.

At step 216, a second search parameter may be determined based at least in part on the operator initiated command.

At step 218, a physical location of a data unit corresponding to the first search parameter may be determined.

At step 220, a data member (e.g., data member 160) corresponding to the second search parameter may be identified. In general, the data member corresponds to a sub-set of data within a corresponding data unit (e.g., data unit 150).

At step 222, the data member may be outputted to any appropriate device such as an operator interface device (e.g., 102). From step 222, the method 200 may return to decision block 204.

Figure 3:
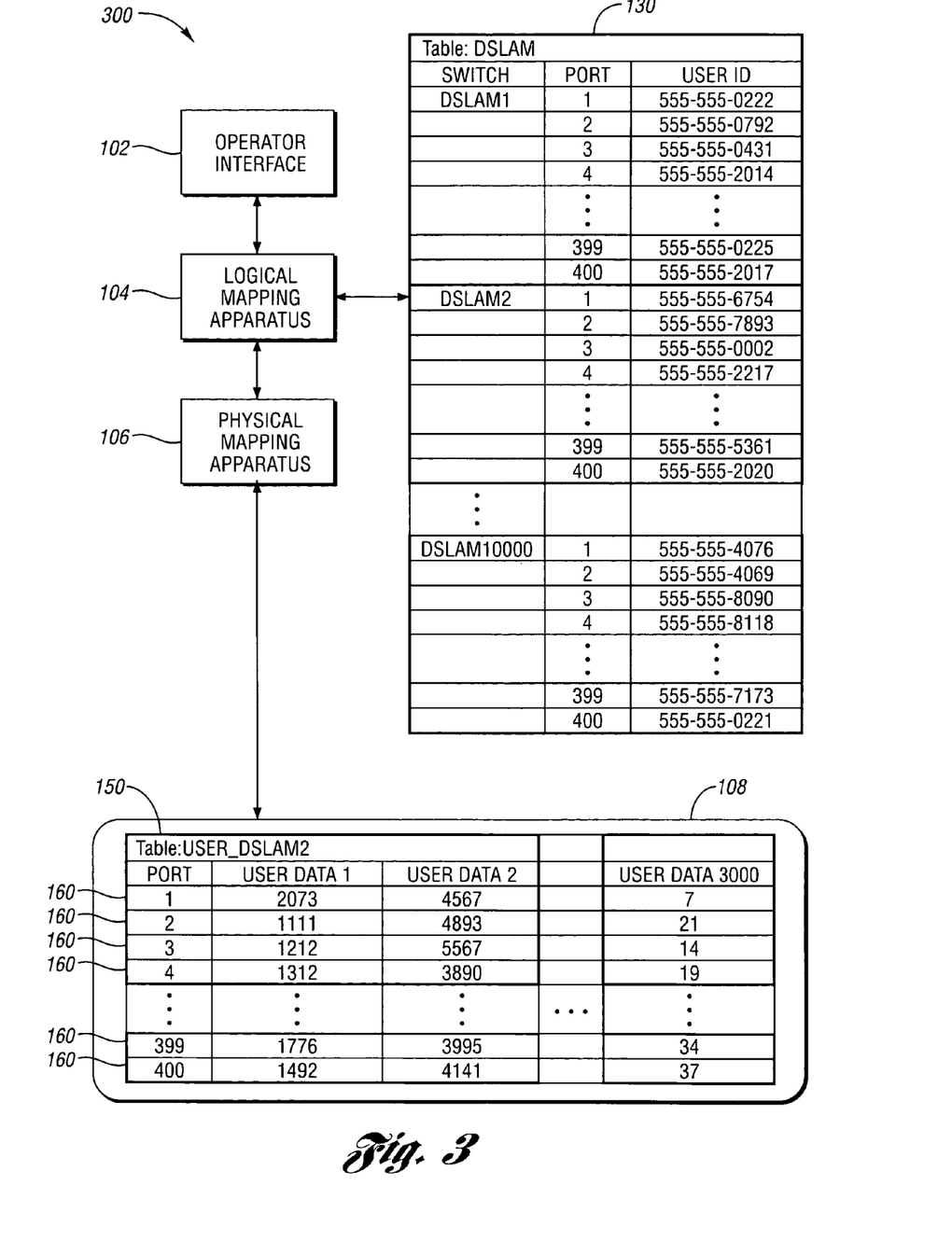
FIG. 3 is a block diagram of an exemplary embodiment of the present disclosure.

Referring now to FIG. 3, a block diagram of an exemplary embodiment of the present disclosure is illustrated. The exemplary embodiment of FIG. 3 is provided to further instruct one skilled in the art to variously employ the present disclosure. Accordingly, it should be understood that the exemplary embodiment is non-limiting and many other embodiments within the spirit and scope of the present disclosure are contemplated by the present disclosure. The exemplary embodiment is generally provided in the context of a Digital Subscriber Line (i.e., DSL) system 300. The system 300 may be implemented similarly to the system 100 of FIG. 1 and may implement one or more steps of the method 200 previously described in connection with FIG. 2.

In the exemplary embodiment of FIG. 3, the DSL system (i.e., network) 300 is illustrated as having ten thousand DSL Access Multiplexers (i.e., DSLAMs) with each DSLAM coupling four hundred DSL subscribers (i.e., users) to the DSL system 300 via four hundred corresponding ports. The system 300 is further illustrated as storing three thousand data points (i.e., data values) for each subscriber. While particular quantities of DSLAMs, subscribers, ports, and data points are provided for clarity, it should be understood that the system 300 may be implemented using any appropriate number of DSLAMs coupled to any appropriate number of subscribers via any appropriate number of ports and recording any appropriate number of data points to satisfy the requirements of a particular application.

When a user (i.e., subscriber) seeks technical support, the user generally provides a technical support person (i.e., system operator) with a user identifier, such as a DSL telephone number corresponding to the user. For purposes of illustration, the user identifier may be 555-555-0002. The system operator may then generate an operator command (i.e., signal, operator initiated command, etc.) corresponding to the user identifier via the operator interface 102. The operator command is generally presented by the operator interface 102 to the logical mapping apparatus 104.

The logical mapping apparatus 104 may receive the operator command and may determine a first search parameter and a second search parameter corresponding to the operator command. In the exemplary embodiment of FIG. 3, the logical mapping apparatus 104 may determine the first and second search parameters using a table 130 in electronic communication with the logical mapping apparatus 104. However, as previously discussed in connection with system 100, the search parameters may be determined using any appropriate process (e.g., an algorithm, a hash function, a database, an index file, etc.) to meet the design criteria of a particular application. By referencing the user identifier (i.e., 555-555-0002) to the table 130, the first search parameter may be determined by the logical mapping apparatus 104 to correspond to the switch (e.g., DSLAM2) coupling the user to the DSL system 300. Similarly, the second search parameter may be determined by the logical mapping apparatus 104 to correspond to the port coupling the user to the switch (e.g., port 3). The logical mapping apparatus may then present the first and second search parameters to the physical mapping apparatus 106.

Optionally, the logical mapping apparatus 104 may further generate a new data unit 150, generate a unique identifier for the new data unit (i.e., previously unidentified data unit) 150, and/or map the unique identifier to the new data unit 150 in response to a new DSLAM being added to the system 300.

The physical mapping apparatus 106 generally receives the first and second search parameters (e.g., DSLAM2 and port 3) and determines a physical location of a data unit 150 corresponding to the first search parameter. In the exemplary embodiment of FIG. 3, the physical mapping apparatus 106 locates a table corresponding to the first search parameter on the physical device 108 using any appropriate mapping technique such as a file directory. As illustrated in the exemplary embodiment, system efficiency may be increased by implementing data units 150 having names (i.e., identifiers) that utilize all or part of the first search parameter (e.g., first search parameter="DSLAM2" and the data unit name="USER_DSLAM2"). That is, implementing data units 150 having names that utilize all or part of the first search parameter may provide for the physical location of the data unit 150 to be determined with reduced mapping and/or search steps (i.e, functions).

The physical mapping apparatus 106 may also identify a data member 160 from the data stored within the data unit 150 based at least in part on the second search parameter. In the exemplary embodiment, the physical mapping apparatus 106 may identify the member 160 corresponding to port 3. The data member 160 (i.e., user data values in the row corresponding to port 3) may be output (i.e., transmitted) to the system operator. In such a manner, the system operator may retrieve the user data corresponding to the subscriber. In at least one embodiment, the user parameters (e.g., user data 1, user data 2, etc.) for each port may be stored in a compressed state and/or as a Binary Large Object (BLOB) to increase efficiency and/or reduce data storage requirements.

In the exemplary two-tiered data system 300 of FIG. 3, a system operator may retrieve data corresponding to a subscriber from among 12,000,000,000 (i.e., 10,000*400*3000) potential data points. At the logical mapping apparatus 104, the system operator performs a search of ten thousand records corresponding to the total number of DSLAMs in the system 300. At the physical mapping apparatus 106, the system operator performs a search of four hundred records corresponding to the number of ports on a DSLAM. Accordingly, the exemplary system 300 may provide increased data retrieval rates, as compared with a conventional data storage system requiring a search of the entire 12,000,000,000 data points, by implementing two or more searches on sub-sets of the 12,000,000,000 data points.

Furthermore, grouping data points into data units 150 may provide for updating of a first data unit 150 with little or no affect on a search being performed on a second data unit 150 and vice versa, may impede data corruption propagation, may provide increased data storage and/or retrieval efficiency in multi-processor machines, and/or may reduce the amount of modification required to add additional forms of data to the system. Similarly, compressing data points within a data unit 150 may reduce the data storage requirement of the system 300.

While the forgoing disclosure and Figures generally disclose a two-tiered data system, it should be understood that additional tiers may be implemented within the spirit and scope of the present disclosure.

Figure 4:
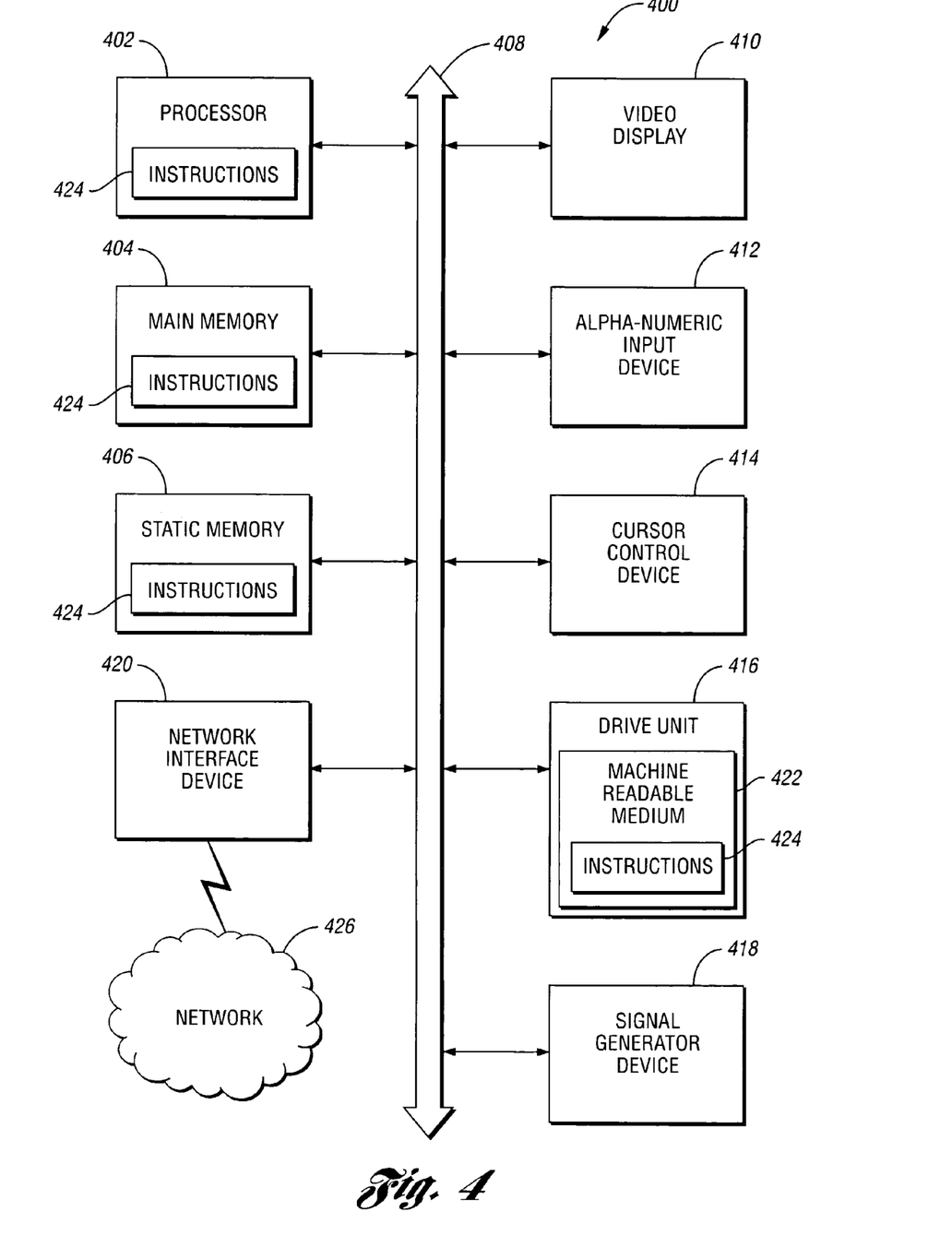
FIG. 4 is a diagrammatic representation of a machine in the form of a computer system according to an embodiment of the present disclosure.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for multi-tiered data access comprising:
   receiving an operator command having an identifier corresponding to a unique pair of first and second search parameters;
   determining the first search parameter and the second search parameter using the identifier in response to the operator command;
   determining a physical location in storage of a data unit corresponding to the first search parameter, wherein the storage includes a plurality of data units respectively corresponding to a plurality of different first search parameters with each data unit respectively having a physical location in the storage, wherein each data unit has a plurality of data members respectively corresponding to a plurality of different second search parameters with each of the second search parameters respectively corresponding to a data member of each data unit;
   identifying the data member corresponding to the second search parameter of the data unit which corresponds to the first search parameter; and
   outputting the data member to an operator.

2. The method of claim 1 wherein:
   determining the first search parameter and the second search parameter using the identifier includes using a hash function.

3. The method of claim 1 wherein:
   determining the first search parameter and the second search parameter using the identifier includes using a table.

4. The method of claim 1 wherein:
   the data member is at least one of a Binary Large Object and a compressed data object.

5. The method of claim 1 wherein:
   each of the first search parameters respectively corresponds to at least one of an Asymmetric Digital Subscriber Line, an Asynchronous Transfer Mode Switch, and a Digital Subscriber Line Access Multiplexer.

6. The method of claim 5 wherein:
   each of the second search parameters respectively corresponds to a port on the at least one of an Asymmetric Digital Subscriber Line, an Asynchronous Transfer Mode Switch, and a Digital Subscriber Line Access Multiplexer.

7. The method of claim 1 further comprising:
   generating a unique identifier and mapping the unique element identifier to a previously unidentified data unit.

8. The method of claim 1 wherein:
   the physical location corresponds to at least one of a location on a magnetic media, a location on an optical media, a location on a hard drive, and a memory address.

9. A system for multi-tiered data access, the system comprising:
   a storage having a plurality of data units respectively corresponding to a plurality of different first search parameters with each data unit respectively having a physical location in the storage, wherein each data unit has a plurality of data members respectively corresponding to a plurality of different second search parameters with each of the second search parameters respectively corresponding to a data member of each data unit;
   a logical mapping apparatus for receiving an operator command having an identifier corresponding to a unique pair of first and second search parameters and for determining the first search parameter and the second search parameter using the identifier of operator command; and
   a physical mapping apparatus for receiving the first search parameter and the second search parameter from the logical mapping apparatus, determining a physical location in the storage of a data unit corresponding to the first search parameter, identifying the data member; corresponding to the second search parameter of the data unit which corresponds to the first search parameter, and outputting the data member to an operator.

10. The system of claim 9 wherein the logical mapping apparatus uses a hash function for determining at least one of the first search parameter and the second search parameter.

11. The system of claim 9 wherein the logical mapping apparatus uses a table for determining at least one of the first search parameter and the second search parameter.

12. The system of claim 11 wherein the logical mapping apparatus is in electronic communication with a database and the database comprises the table.

13. The system of claim 11 wherein the table is stored in a memory electronically, coupled to the logical mapping apparatus.

14. The system of claim 9 wherein the data member is a Binary Large Object.

15. The system of claim 9 wherein the data member is a compressed data object.

16. The system of claim 9 wherein the first search parameter corresponds to at least one of an Asymmetric Digital Subscriber Line, an Asynchronous Transfer Mode Switch, and a Digital Subscriber Line Access Multiplexer.

17. The system of claim 16 wherein the second search parameter corresponds to a port on the at least one of an Asymmetric Digital Subscriber Line, an Asynchronous Transfer Mode Switch, and a Digital Subscriber Line Access Multiplexer.

18. The system of claim 9 wherein the logical mapping apparatus further generates a unique identifier and maps the unique identifier to a previously unidentified data unit.

19. A method for multi-tiered data access for use with a digital subscriber line (DSL) system, the method comprising:

receiving an operator command having a telephone number corresponding to a unique pair of first and second search parameters, wherein the first search parameter corresponds to at least one of an Asymmetric Digital Subscriber Line (ADSL), an Asynchronous Transfer Mode (ATM) Switch, and a DSL Access Multiplexer (DSLAM), wherein the second search parameter corresponds to a port on the least one of an ADSL, an ATM Switch, and a DSLAM;

determining the first search parameter and the second search parameter using the identifier in response to the operator command;

determining a physical location in storage of a data unit corresponding to the first search parameter, wherein the storage includes a plurality of data units respectively corresponding to a plurality of different first search parameters with each data unit respectively having a physical location in the storage, wherein each data unit has a plurality of data members respectively corresponding to a plurality of different second search parameters with each of the second search parameters respectively corresponding to a data member of each data unit;

identifying the data member corresponding to the second search parameter of the data unit which corresponds to the first search parameter; and outputting the data member to an operator interface device.

20. The method of claim 19 wherein:

each of the first search parameters resolves directly into the physical location of the corresponding data unit.

* * * * *